(12) United States Patent
Chang et al.

(10) Patent No.: US 12,192,460 B2
(45) Date of Patent: Jan. 7, 2025

(54) ENCODING METHOD, DECODING METHOD, ENCODING/DECODING SYSTEM, ENCODER, AND DECODER

(71) Applicant: Industrial Technology Research Institute, Hsinchu (TW)

(72) Inventors: Yao-Jen Chang, Hsinchu (TW);
Chun-Lung Lin, Yunlin County (TW);
Ching-Chieh Lin, Taipei (TW);
Jih-Sheng Tu, Yilan County (TW);
Chao-Hsiung Hung, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/460,622

(22) Filed: Sep. 4, 2023

(65) Prior Publication Data

US 2023/0412804 A1  Dec. 21, 2023

Related U.S. Application Data

(62) Division of application No. 17/168,142, filed on Feb. 4, 2021, now Pat. No. 11,785,215, which is a division
(Continued)

(30) Foreign Application Priority Data

May 13, 2015 (TW) ................................. 104115230

(51) Int. Cl.
*H04N 1/64* (2006.01)
*H04N 19/103* (2014.01)
(Continued)

(52) U.S. Cl.
CPC ......... *H04N 19/119* (2014.11); *H04N 19/103* (2014.11); *H04N 19/13* (2014.11);
(Continued)

(58) Field of Classification Search
CPC .... H04N 19/119; H04N 19/103; H04N 19/13; H04N 19/176; H04N 19/182;
(Continued)

(56) References Cited

U.S. PATENT DOCUMENTS 7,236,530 B2 *  6/2007  Chujoh ................. H04N 19/70
                                                382/233
7,724,164 B2 *  5/2010  Ohk ....................... H04N 19/94
                                                341/50
(Continued)

*Primary Examiner* — Howard D Brown, Jr.
(74) *Attorney, Agent, or Firm* — JCIPRNET

(57) ABSTRACT

An encoding, a decoding method, a system for encoding and decoding, an encoder, and a decoder are provided. The encoding method includes the following. In a palette mode, if colors of pixels of a coding unit block are all represented by one or more major colors of the coding unit block, a flag is set as a first state value, and if the color of at least one pixel of the coding unit block is not represented by the one or more major colors of the coding unit block, the flag is set as a second state value. The encoding method further includes establishing a palette table corresponding to the coding unit block according to a state value of the flag and the one or more major colors.

6 Claims, 12 Drawing Sheets

Related U.S. Application Data of application No. 15/822,215, filed on Nov. 27, 2017, now Pat. No. 10,944,969, which is a division of application No. 14/733,976, filed on Jun. 9, 2015, now Pat. No. 10,187,639.

(60) Provisional application No. 62/011,585, filed on Jun. 13, 2014.

(51) Int. Cl.

| | | |
|---|---|---|
| *H04N 19/119* | (2014.01) | |
| *H04N 19/13* | (2014.01) | |
| *H04N 19/176* | (2014.01) | |
| *H04N 19/182* | (2014.01) | |
| *H04N 19/186* | (2014.01) | |
| *H04N 19/463* | (2014.01) | |
| *H04N 19/51* | (2014.01) | |
| *H04N 19/593* | (2014.01) | |
| *H04N 19/70* | (2014.01) | |
| *H04N 19/91* | (2014.01) | |
| *H04N 19/124* | (2014.01) | |
| *H04N 19/94* | (2014.01) | |

(52) U.S. Cl.
CPC ......... *H04N 19/176* (2014.11); *H04N 19/182* (2014.11); *H04N 19/186* (2014.11); *H04N 19/463* (2014.11); *H04N 19/593* (2014.11); *H04N 19/70* (2014.11); *H04N 19/91* (2014.11); *H04N 19/124* (2014.11); *H04N 19/94* (2014.11)

(58) Field of Classification Search
CPC .. H04N 19/186; H04N 19/463; H04N 19/593; H04N 19/70; H04N 19/91; H04N 19/124; H04N 19/94
See application file for complete search history.

(56) References Cited

U.S. PATENT DOCUMENTS

| | | | |
|---|---|---|---|
| 2004/0120588 A1* | 6/2004 | Seroussi | G06T 9/005 382/238 |
| 2009/0010533 A1* | 1/2009 | Hung | H04N 19/44 382/166 |
| 2014/0348243 A1* | 11/2014 | Sato | H04N 19/46 375/240.16 |
| 2015/0146976 A1* | 5/2015 | Ma | H04N 19/70 382/166 |
| 2015/0229933 A1* | 8/2015 | Guo | H04N 19/12 375/240.02 |
| 2015/0365670 A1* | 12/2015 | Chang | H04N 19/186 375/240.02 |
| 2016/0234498 A1* | 8/2016 | Misra | H04N 19/46 |
| 2016/0323594 A1* | 11/2016 | Sun | H04N 19/129 |
| 2017/0127077 A1* | 5/2017 | Chuang | H04N 19/103 |

* cited by examiner

| | |
|---|---|
| C1 | 0 |
| C3 | 1 |
| C4 | 2 |
| C5 | 3 |

FIG. 2B

| Index value (302) | Color (304) |
|---|---|
| 0 | C1:10 |
| 1 | C3:100 |
| 2 | C4:200 |
| 3 | C5:255 |

| 0 | 0 | 0 | 1 |
|---|---|---|---|
| 0 | 0 | 0 | 2 |
| 0 | 0 | 0 | 2 |
| 0 | 0 | 1 | 3 |

```
parse PLTMode
601 ─── if(PLTMode = enabled)
602 ─── parse PLTSize and PLT  //PLT is major color
603 ─── uiIndexMaxSize = PLTSize;  // value of Index= 0, 1, 2, 3, ..., uiIndexMaxSize – 1
                                   // 0, 1, 2, 3, ..., uiIndexMaxSize – 1 are index of the major color
604 ─── decodeBinEP(uiSignalEscape);  // decodeBinEP means using bypass mode
                                      // uiSignalEscape is the flag
605 ─── if(uiSignalEscape enabled)
606 ─── uiIndexMaxSize++;  // value of Index = 0, 1, 2, 3, ..., uiIndexMaxSize – 1
                           // uiIndexMaxSize – 1 is the escape index
607 ─── parse Indexes in the index map
608 ─── parse Pixel values whose indexes are escape index
```

FIG. 6A

|  |  |
|---|---|
| C1 | 0 |
| C$_{Escape}$ | 1 |

FIG. 7B

| Index value (802) | Color (804) |
|---|---|
| 0 | C1:10 } 810 |
| 1 | C$_{Escape}$ } 820 |

| | | | |
|---|---|---|---|
| 0 | 0 | 0 | 1 |
| 0 | 0 | 0 | 1 |
| 0 | 0 | 0 | 1 |
| 0 | 0 | 1 | 1 |

|  | All Intra | | |
|---|---|---|---|
|  | G/Y | B/U | R/V |
| RGB, text & graphics with motion, 1080p | -0.5% | -0.5% | -0.5% |
| RGB, text & graphics with motion, 720p | -0.2% | -0.1% | -0.2% |
| RGB, mixed content, 1440p | 0.0% | 0.0% | 0.0% |
| RGB, mixed content, 1080p | -0.1% | -0.1% | -0.1% |
| RGB, Animation, 720p | 0.0% | 0.0% | 0.0% |
| RGB, camera captured, 1080p | 0.0% | 0.0% | 0.0% |
| YUV, text & graphics with motion, 1080p | -0.7% | -0.6% | -0.6% |
| YUV, text & graphics with motion, 720p | -0.2% | -0.2% | -0.2% |
| YUV, mixed content, 1440p | 0.0% | 0.0% | -0.1% |
| YUV, mixed content, 1080p | -0.1% | -0.1% | -0.1% |
| YUV, Animation, 720p | 0.0% | 0.0% | 0.0% |
| YUV, camera captured, 1080p | 0.0% | 0.0% | 0.0% |
| Enc Time[%] | 101% | | |
| Dec Time[%] | 100% | | |

FIG. 10A

|  | All Intra | | |
|---|---|---|---|
|  | G/Y | B/U | R/V |
| RGB, text & graphics with motion, 1080p | -1.4% | -1.3% | -1.3% |
| RGB, text & graphics with motion, 720p | -0.6% | -0.3% | -0.4% |
| RGB, mixed content, 1440p | -0.7% | -0.6% | -0.5% |
| RGB, mixed content, 1080p | -0.8% | -0.8% | -0.8% |
| RGB, Animation, 720p | 0.0% | 0.0% | 0.0% |
| RGB, camera captured, 1080p | 0.0% | 0.0% | 0.0% |
| YUV, text & graphics with motion, 1080p | -1.4% | -1.4% | -1.5% |
| YUV, text & graphics with motion, 720p | -0.5% | -0.5% | -0.9% |
| YUV, mixed content, 1440p | -0.4% | -0.6% | -0.7% |
| YUV, mixed content, 1080p | -0.6% | -1.0% | -1.1% |
| YUV, Animation, 720p | 0.0% | 0.0% | -0.1% |
| YUV, camera captured, 1080p | 0.0% | 0.0% | 0.0% |
| Enc Time[%] | 101% | | |
| Dec Time[%] | 100% | | |

FIG. 10B

ENCODING METHOD, DECODING METHOD, ENCODING/DECODING SYSTEM, ENCODER, AND DECODER

CROSS-REFERENCE TO RELATED APPLICATION

This application is a divisional application of and claims the priority benefit of U.S. application Ser. No. 17/168,142, filed on Feb. 4, 2021. The prior U.S. application Ser. No. 17/168,142 is a divisional application of and claims the priority benefit of U.S. application Ser. No. 15/822,215, filed on Nov. 27, 2017. The prior U.S. application Ser. No. 15/822,215 is a divisional application of and claims the priority benefit of U.S. application Ser. No. 14/733,976, filed on Jun. 9, 2015. The prior application Ser. No. 14/733,976 claims the priority benefits of U.S. provisional application Ser. No. 62/011,585, filed on Jun. 13, 2014, and Taiwan application Ser. No. 104115230, filed on May 13, 2015. The entirety of each of the above-mentioned patent applications is hereby incorporated by reference herein and made a part of this specification.

TECHNICAL FIELD

The present disclosure relates to an encoding method and a decoding method for a coding unit block having a plurality of pixels, an encoding/decoding system using the methods, an encoder, and a decoder.

BACKGROUND

With advancements in technologies, demands for higher quality and larger size of video frame continue to increase as resolution, specification and size of a video display becomes higher. To satisfy the demands, Joint Collaborative Team on Video Coding (JCT-VC) co-founded by Video Coding Experts Group (VCEG) under ITU-T (International Telecommunication Union Telecommunication Standardization Sector) and Moving Picture Experts Group (MPEG) under ISO (International Organization for Standardization)/IEC (International Electrotechnical Commission) has started to work on H.265/HEVC (High Efficiency Video Coding) project which aims to provide an encoding efficiency higher than that of a video compression standard of H.264/AVC (Advanced Video Coding). The project is important for high resolution videos such as HD (High Definition), Ultra HD (Ultra High Definition), and the like.

An environment for such video application in large size and high resolution mostly include natural video images and was finalized in 2013. Currently, the HEVC SCC (Screen Content Coding; SCC) standard is under establishment. A video content for screen sharing usually includes a hybrid video content material. For example, a frame may include a natural image, a massive amount of text, a mouse pointer, or various lines, etc. Because this screen application environment is different with the target designed by H.265/HEVC, JCT-VC has recently changed its focus onto developments for new screen coding standard technology with higher performance. SCC standard is developed based on existing tools of H.265/HEVC. For example, a palette mode is an encoding technology for the SCC standard. Technical concepts of the palette mode includes searching for one or more major colors to represent pixels within a coding unit (CU) block currently under encoding, and using indexes corresponding to the major colors to perform index numbering for pixels within the coding unit block. An encoding end establishes an index map by using the indexes corresponding to the major colors, and transmits the one or more major colors and the indexes corresponding to colors of the pixels in the index map to a decoding end.

However, in order to maintain the flexibility in the encoding computation, one index is reserved for specific pixels not represented by the major colors in the coding unit block in the palette mode. Said specific pixels are known as escape pixel(s), and the reserved index is known as an escape index. In view of the above, it can be known that in a transmitting process in the palette mode, the transmitted indexes include the indexes of the major colors and the escape index. Therefore, in the case where the coding unit block currently under encoding does not include the escape pixel, preservation of the escape index can cause an unnecessary burden in transmission of the indexes of the coding unit block.

SUMMARY

The present disclosure is directed to an encoding method, a decoding method, an encoding/decoding system using the methods, an encoder, and a decoder.

An exemplary embodiment of the present disclosure provides an encoding method for a coding unit block having a plurality of pixels. The encoding method includes: in a palette mode, if colors of the pixels of the coding unit block are all represented by one or more major colors of the coding unit block, setting a flag corresponding to the coding unit block as a first state value; and if the color of at least one pixel among the pixels of the coding unit block is not represented by the one or more major colors of the coding unit block, setting the flag corresponding to the coding unit block as a second state value. The encoding method further includes: establishing a palette table corresponding to the coding unit block according to a state value of the flag and the one or more major colors.

An exemplary embodiment of the present disclosure provides a decoding method for a coding unit block having a plurality of pixels. The decoding method includes: in a palette mode, determining a state value of a flag corresponding to the coding unit block; if the flag is a first state value, determining that an amount of indexes corresponding to the coding unit block is an amount of one or more major colors of the coding unit block; and if the flag is a second state value, determining that the amount of the indexes corresponding to the coding unit block is the amount of the one or more major colors of the coding unit block plus one.

An exemplary embodiment of the present disclosure provides an encoder including a flag setting module and a palette table establishing module. The flag setting module sets a flag corresponding to the coding unit block as a first state value if colors of a plurality of pixels of the coding unit block are all represented by one or more major colors of the coding unit block in a palette mode, or the flag setting module sets the flag corresponding to the coding unit block as a second state value if the color of at least one pixel among the pixels of the coding unit block is not represented by the one or more major colors of the coding unit block in the palette mode. The palette table establishing module establishes a palette table corresponding to the coding unit block according to a state value of the flag and the one or more major colors.

An exemplary embodiment of the present disclosure provides a decoder including a flag state determining module. The flag state determining module determines a state value of a flag corresponding to a coding unit block in a palette mode. If the flag is a first state value, the flag state determining module determines that an amount of indexes corresponding to the coding unit block is an amount of one or more major colors of the coding unit block. If the flag is a second state value, the flag state determining module determines that the amount of the indexes corresponding to the coding unit block is the amount of the one or more major colors of the coding unit block plus one.

An exemplary embodiment of the present disclosure provides an encoding/decoding system including an encoder and a decoder. The encoder sets a flag corresponding to the coding unit block as a first state value if colors of a plurality of pixels of the coding unit block are all represented by one or more major colors of the coding unit block in a palette mode, or the encoder sets the flag corresponding to the coding unit block as a second state value if the color of at least one pixel among the pixels of the coding unit block is not represented by the one or more major colors of the coding unit block in the palette mode. Further, the encoder establishes a palette table corresponding to the coding unit block according to a state value of the flag and the one or more major colors. The encoder generates an index map corresponding to the coding unit block according to the palette table corresponding to the coding unit block and the colors of the pixels of the coding unit block, and transmits the flag corresponding to the coding unit block, the palette table corresponding to the coding unit bock and the index map corresponding to the coding unit block to the decoder.

An exemplary embodiment of the present disclosure provides a decoding method for a coding unit block having a plurality of pixels. The decoding method includes: in a palette mode, determining a state value of a flag corresponding to the coding unit block; if the flag is a first state value, determining that the coding unit block does not include an escape pixel; and if the flag is a second state value, determining that the coding unit block includes at least one of the escape pixel.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2A and FIG. 2B are schematic diagrams illustrating operations of encoding image according to an exemplary embodiment of the present disclosure.

FIG. 3 is a schematic diagram illustrating a palette table according to an exemplary embodiment of the present disclosure.

FIG. 4 illustrates an example for establishing an index map according to an exemplary embodiment of the present disclosure.

FIG. 6A illustrates a program code for decoding the flag, the palette table and the index map corresponding to the coding unit block by using the CABAC according to an exemplary embodiment of the present disclosure.

FIG. 7A and FIG. 7B are schematic diagrams illustrating operations of encoding image according to another exemplary embodiment of the present disclosure.

FIG. 8 is a schematic diagram illustrating a palette table according to another exemplary embodiment of the present disclosure.

FIG. 9 illustrates an example for establishing an index map according to another exemplary embodiment of the present disclosure.

FIG. 10A and FIG. 10B are schematic diagrams illustrating test results obtained from encoding/decoding image according to exemplary embodiments of the present disclosure.

DETAILED DESCRIPTION

Figure 1A:
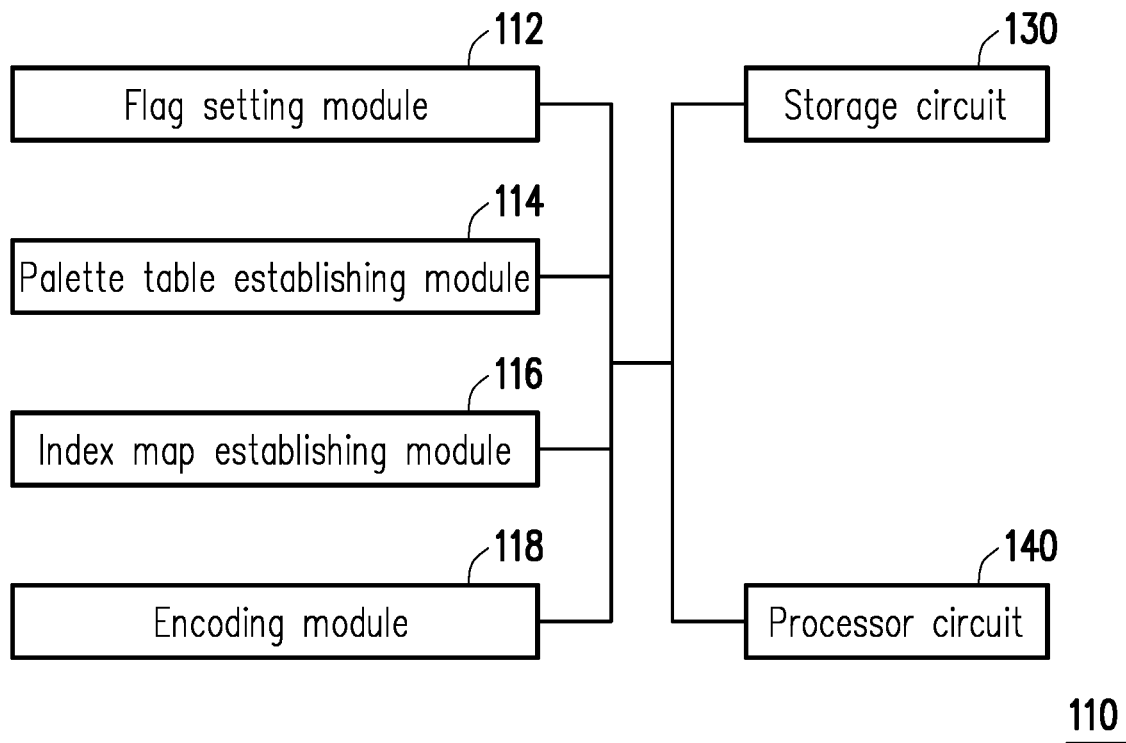
FIG. 1A illustrates an encoder according to an exemplary embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1A illustrates an encoder according to an exemplary embodiment of the present disclosure.

Figures 1, 6B:
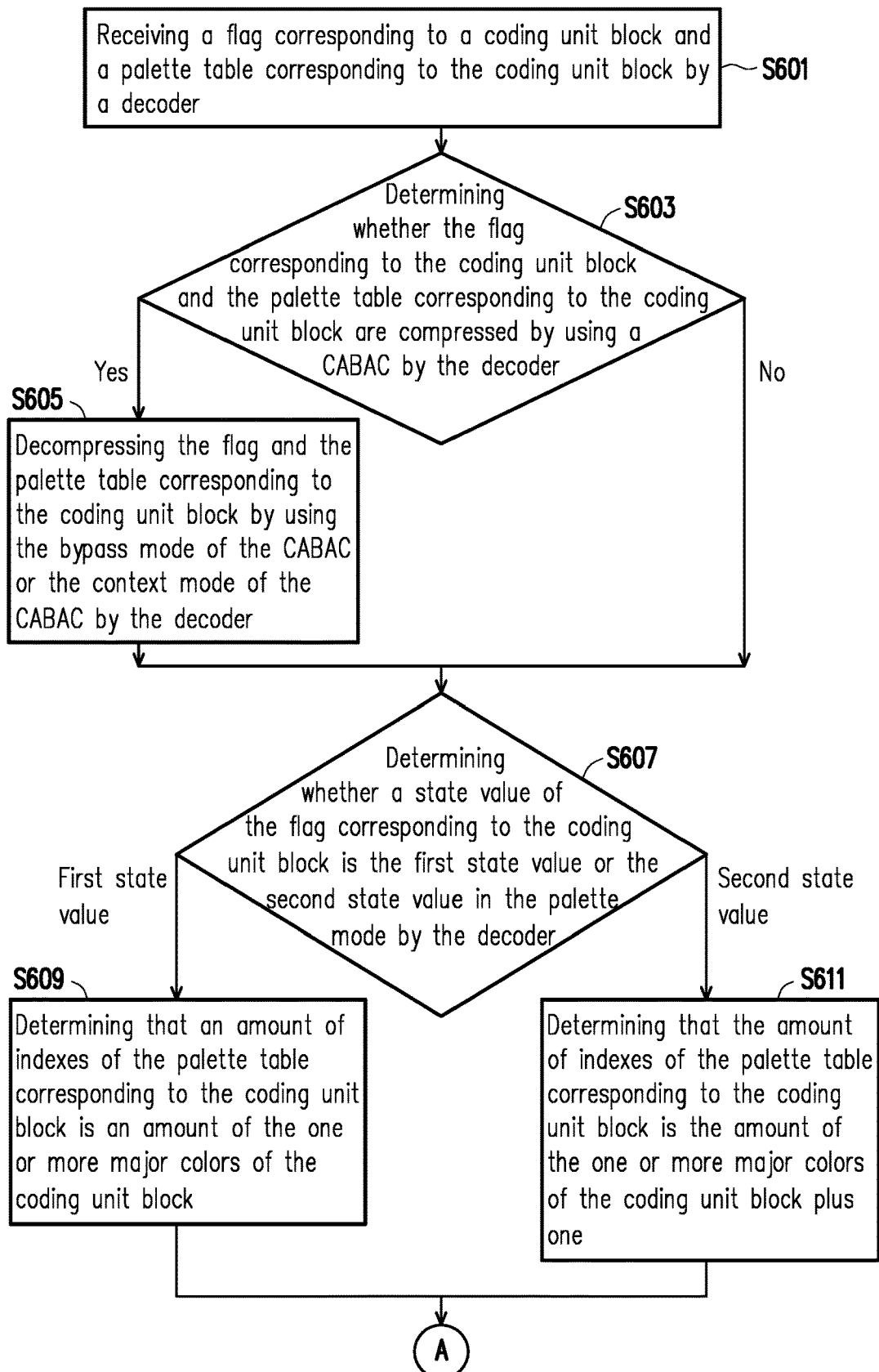
FIG. 6B-1 and FIG. 6B-2 are a flowchart illustrating a decoding method according to an exemplary embodiment of the present disclosure.

Referring to FIG. 1, an encoder 110 includes a flag setting module 112, a palette table establishing module 114, an index map establishing module 116, an encoding module 118, a storage circuit 130 and a processor circuit 140.

In the present exemplary embodiment, the storage circuit 130 is configured to store various data, program codes, images for processing, or images being processed. For example, the storage circuit 130 may be a memory or a hard disk drive (HDD), but the present disclosure is not limited thereto. The processor circuit 140 is configured to control overall operations of the encoder 110. For example, the processor circuit 140 may be a central processing unit (CPU), a micro-processor, or an embedded controller, which are not particularly limited in the present disclosure. The processor circuit 140 is coupled to the storage circuit 130, and configured to control the flag setting module 112, the palette table establishing module 114, the index map establishing module 116, and the encoding module 118 to perform an encoding operation.

Under the H.265/HEVC standard, one coding tree unit (CTU) is used as the maximum processing block for encoding the coding unit (CU). The size of the coding tree unit may be set to a 64×64 block. The coding unit block may be less than or equal the block size of the coding tree unit. For instance, the coding unit block is a block of a square having the size of 64×64, 32×32, 16×16 or 8×8. Further, the coding unit block in the exemplary embodiment of the present disclosure has a plurality of pixels, where the unit size of the coding unit block is the pixel. In the present exemplary embodiment, for illustrative convenience, descriptions are made below by using the coding unit block with the block size of 4×4.

In the present exemplary embodiment, the flag setting module 112 is configured to set a flag for the coding unit block in a palette mode. For example, when colors of the pixels of the coding unit block are all represented by one or more major colors of the coding unit block, the flag setting module 112 sets the flag corresponding to the coding unit block as a first state value. Otherwise, when the color of at least one pixel among the pixels of the coding unit block is not represented by the one or more major colors of the coding unit block, the flag setting module 112 sets the flag corresponding to the coding unit block as a second state value. As another example, when the coding unit block does not include an escape pixel, the flag setting module 112 sets the flag of the coding unit block as the first state value. Otherwise, when the coding unit block includes the escape pixel(s), the flag setting module 112 sets the flag of the coding unit block as the second state value. It should be noted that, the color as mentioned in the present disclosure is not limited only to be a color composed of one component element but may also refer to a corresponding color composed of multiple component elements, such as a color composed of three component elements as corresponding to a YUV format or a RGB format. The YUV format is configured to compile a color space, in which "Y" represents a luminance (or Luma) component, U and V represent chrominance (Chroma) components, and Y, Cb and Cr are used to describe the component elements thereof. The RGB format is an additive color model configured to add color light of three primary colors (read, green, and blue) in different ratios so as to generate various color light, and R, G, and B are used to describe the component elements thereof.

The palette table establishing module 114 is configured to establish a palette table corresponding to the coding unit block.

The index map establishing module 116 is configured to generate an index map corresponding to the coding unit block according to the palette table corresponding to the coding unit block and the colors of the pixels of the coding unit block.

The encoding module 118 is configured to encode the flag, the palette table, and index map which are corresponding to the coding unit block. An encoding method used by the encoding module 118 may be completed by using a bypass mode of a context-based adaptive binary arithmetic coding (CABAC) or a context mode of the CABAC.

The encoder 110 may transmit the encoded flag, the encoded palette table, and the encoded index map to a decoder, or may directly transmit the flag, the palette table, and the index map without encoding to the decoder. In other words, the encoder 110 may transmit the encoded flag, the encoded palette table, and the encoded index map, or transmit the flag, the palette table, and the index map, which are not encoded, to the decoder. In an exemplary embodiment, the flag, the palette table, and the index map may be transmitted to the decoder by the encoding module 118 through the bypass mode. In another exemplary embodiment, the flag, the palette table, and the index map are compressed through the context mode before transmitting to the decoder. The encoder 110 may also encode a bit number of an index value and a pixel value of the escape pixel before transmitting to the decoder, or the encoder 110 may transmit the bit number of the index value in the palette table and the pixel value of the escape pixel, which are not encoded, to the decoder. In another exemplary embodiment, the flag, the palette table, and the index map may also be encoded through different encoding modes respectively. For example, the encoding module 118 encodes the flag by using the bypass mode and encodes the palette table and the index map by using the context mode, and the encoder 110 transmits the encoded flag, the encoded palette table, and the encoded index map to the decoder. In addition, the encoder 110 may be implemented in an image sending terminal, the decoder may be implemented in an image receiving terminal, and the encoder and the decoder may communicate with each other in a wired or a wireless manner.

Figure 1B:
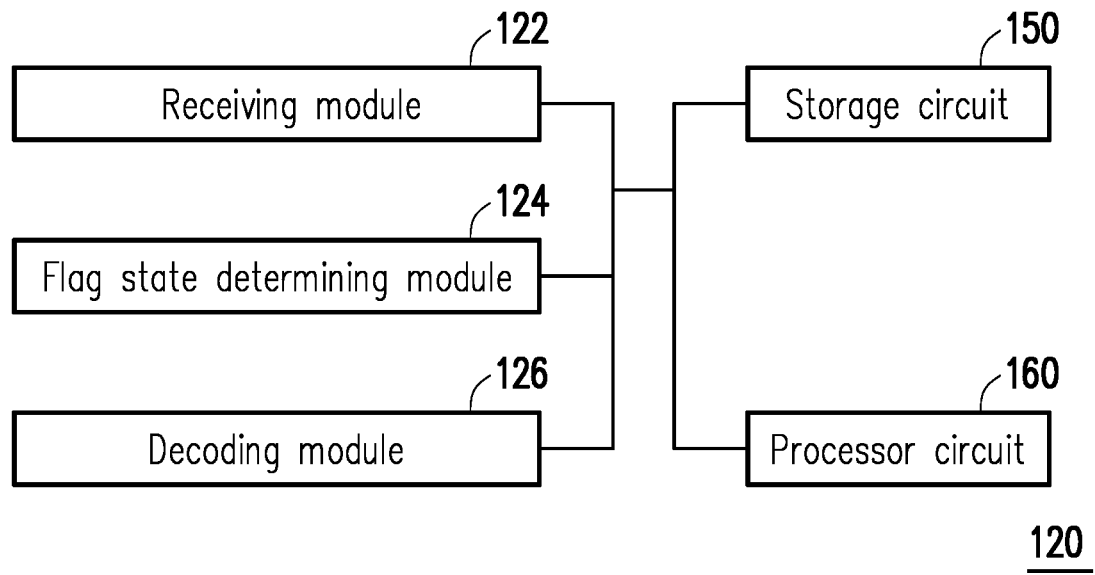
FIG. 1B illustrates a decoder according to an exemplary embodiment of the present disclosure.

FIG. 1B illustrates a decoder according to an exemplary embodiment of the present disclosure.

Referring to FIG. 1B, a decoder 120 includes a receiving module 122, a flag state determining module 124, a decoding module 126, a storage circuit 150, and a processor circuit 160.

The storage circuit 150 is configured to store various data, program codes, images for processing, or images being processed. For example, the storage circuit 150 may be a memory or a hard disk, but the present disclosure is not limited thereto. The processor circuit 160 is configured to control overall operations of the decoder 120. In the present exemplary embodiment, the processor circuit 160 controls the receiving module 122, the flag state determining module 124, and the decoding module 126 to complete a decoding operation. For example, the processor circuit 160 may be a central processing unit, a micro-processor, or an embedded controller, which are not particularly limited in the present disclosure.

Corresponding to the encoder 110, the receiving module 122 of the decoder 120, in the palette mode, is configured to receive the flag and the palette table corresponding to the coding unit block transmitted by the encoder 110. The decoding module 126 of the decoder 120 receives the index map corresponding to the coding unit block. The flag, the palette table, and the index map corresponding to the coding unit block transmitted from the encoder 110 may be the flag, the palette table, and the index map which are encoded by the CABAC, or may be the flag, the palette table, and the index map corresponding to the coding unit block which are not encoded by the CABAC. Therefore, the receiving module 122 determines whether the flag corresponding to the coding unit block and the palette table corresponding to the coding unit block are compressed by using the CABAC, and the decoding module 126 determines whether the index map corresponding to the coding unit block is compressed by using the CABAC. In the present exemplary embodiment, the receiving module 122 of the decoder 120 receives the flag and the palette table corresponding to the coding unit block first, and determines whether the flag corresponding to the coding unit block and the palette table corresponding to the coding unit block are compressed by using the CABAC. If the receiving module 122 determines that the received flag corresponding to the coding unit block and the received palette table corresponding to the coding unit block are compressed by using the CABAC, the receiving module 122 performs a CABAC decoding on the flag and the palette table, which are encoded by the CABAC, in order to obtain the maximum value of indexes of the palette table. Thereafter, the decoding module 126 of the decoder 120 receives the index map. If the decoding module 126 determines that the index map corresponding to the coding unit block is compressed by using the CABAC, the decoding module 126 performs the CABAC decoding on the index map corresponding to the coding unit block, which is encoded by the CABAC, according to said maximum value of the indexes. However, the present disclosure is not limited thereto. For example, in another exemplary embodiment, while the receiving module 122 is receiving the flag and the palette table corresponding to the coding unit block, the decoding module 126 also receives the index map corresponding to the coding unit block. Therefore, the receiving module 122 and the decoding module 126 perform the CABAC decoding on the flag, the palette table, and the index map corresponding to the coding unit block encoded by the CABAC respectively. In another exemplary embodiment, while the receiving module 122 is performing the CABAC decoding on the flag and the palette table, the decoding module 126 of the decoder 120 receives the index map. Later, after the flag and the palette table are decoded by the receiving module 122, the decoding module 126 of the decoder 120 decodes the received index map.

Herein, similar to the method for encoding used by the encoding module 118, the receiving module 122 and the decoding module 126 may decode the received flag, the received palette table, and the received index map corresponding to the coding unit block by using the bypass mode of the CABAC or the context mode of the CABAC. In another exemplary embodiment, the receiving module 122 may also receive the bit number of the index value in the palette table and the pixel value of the escape pixel transmitted by the encoder 110. Similarly, if the received data are data encoded by the CABAC, the CABAC decoding is performed. Further, as described above, it is possible that the flag, the palette table, and the index map may be encoded by the different encoding modes, respectively. Therefore, if the flag encoded by using the bypass mode and the palette table encoded by using the context mode are received by the receiving module 122 and the index map encoded by using the context mode is received by the decoding module 126, the receiving module 122 decodes the received flag by using the bypass mode and decodes the received palette table by using the context mode, and the decoding module 126 decodes the received index map by using the context mode.

The flag state determining module 124 is configured to receive the flag corresponding to the coding unit block from the receiving module 122, and determine a state value of the received flag corresponding to the coding unit block. For example, when the received flag is the first state value, the flag state determining module 124 determines that the coding unit block does not include the escape pixel. Accordingly, it can be known that the amount of the indexes of the palette table corresponding to the coding unit block is an amount of the one or more major colors of the coding unit block. Otherwise, when the received flag is the second state value, the flag state determining module 124 determines that the coding unit block includes the escape pixel. Accordingly, it can be known that the amount of the indexes of the palette table corresponding to the coding unit block is the amount of the one or more major colors of the coding unit block plus one.

As described above, in the present exemplary embodiment, the decoding module 126 is configured to receive the index map, and the index map transmitted from the encoder 110 may be the index map encoded by the CABAC or the index map not encoded by the CABAC. If the index map encoded by the CABAC is received by the decoding module 126, the decoding module 126 performs the CABAC decoding on the index map encoded by the CABAC according to the amount of the indexes of the palette table corresponding to the coding unit block determined by the flag state determining module 124 so as to decode the indexes of the index map. Herein, the decoding module 126 may perform the decoding by using the bypass mode of the CABAC or using the context mode of the CABAC. In addition, the decoding module 126 reconstructs the pixels of the coding unit block according to the colors of the pixels of the coding unit block in the palette table and the index values of the index map, so as to restore the coding unit block.

The encoder and the decoder may be implemented in different terminals and the data required by each other may be transmitted via a network, but the present disclosure is not limited thereto. In another exemplary embodiment, the encoder and the decoder may be implemented in the same chip, terminal, or system.

Figure 1C:
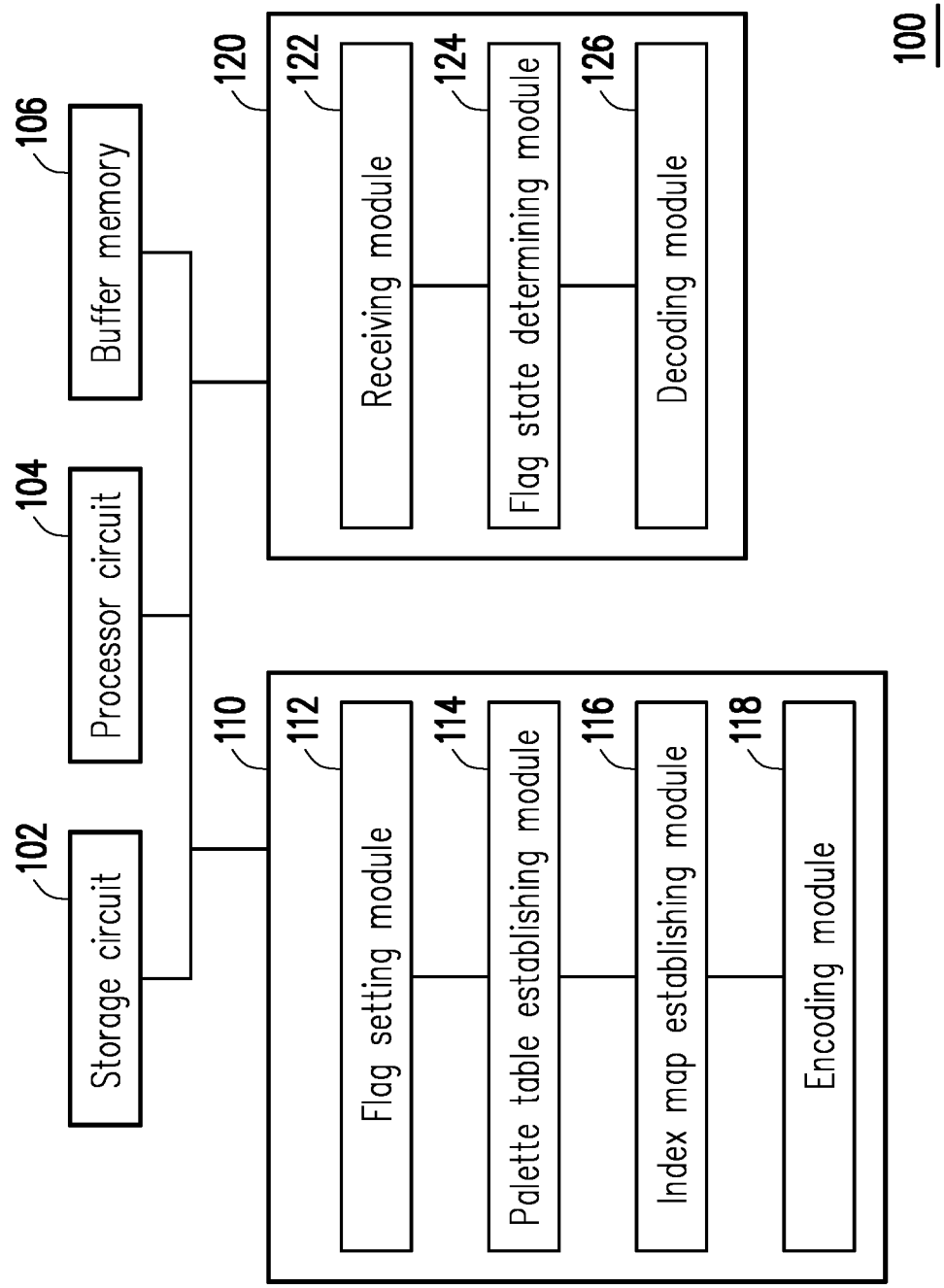
FIG. 1C illustrates an encoding/decoding chip according to an exemplary embodiment of the present disclosure.

FIG. 1C illustrates an encoding/decoding chip according to an exemplary embodiment of the present disclosure.

Referring to FIG. 1C, an encoding/decoding chip 100 (also known as a system for encoding/decoding) includes a storage circuit 102, a processor circuit 104, a buffer memory 106, the encoder 110, and the decoder 120.

The storage circuit 102 is configured to store various data, program codes, images for processing, or images being processed. For example, the storage circuit 102 may be a memory or a hard disk, but the present disclosure is not limited thereto.

The processor circuit 104 is configured to control overall operations of the encoding/decoding chip 100. For example, the processor circuit 104 transmits commands to the storage circuit 102 in order to execute encoding and decoding operation of the encoder 110 and the decoder 120 for images. For example, the processor circuit 104 may be a central processing unit, a micro-processor, or an embedded controller, which are not particularly limited in the present disclosure.

The buffer memory 106 is coupled to the processor circuit 104 and configured to temporarily store data. In another exemplary embodiment, the buffer memory 106 is a static random access memory (SRAM) or other memories, but the present disclosure is not limited thereto. In another exemplary embodiment, the buffer memory 106 may be a dynamic random access memory (DRAM) or other memories. In another exemplary embodiment, the encoding/decoding chip 100 may share use of the storage circuit 102, the processor circuit 104, and/or the buffer memory 106 with other systems.

The storage circuit 102 is coupled to the processor circuit 104 and the buffer memory 106. Operations of the encoder 110 and the decoder 120 are similar to those of the encoder and the decoder depicted in FIG. 1A and FIG. 1B. For example, the encoder 110 includes the flag setting module 112, the palette table establishing module 114, the index map establishing module 116, and the encoding module 118. The decoder 120 includes the receiving module 122, the flag state determining module 124, and the decoding module 126.

The encoder and the decoder in the present disclosure may be implemented by software modules or program codes. For example, the storage circuit 102 stores the flag setting module 112, the palette table establishing module 114, the index map establishing module 116, the encoding module 118, the receiving module 122, the flag state determining module 124, and the decoding module 126 as mentioned above. When the encoding/decoding chip 100 is enabled, the software program codes are loaded from the storage circuit 102 into the buffer memory 106 and executed by the processor circuit 104 in order to run functions of the flag setting module 112, the palette table establishing module 114, the index map establishing module 116, the encoding module 118, the receiving module 122, the flag state determining module 124, and the decoding module 126. However, the present disclosure is not limited thereto. For example, in another exemplary embodiment of the present disclosure, the encoding/decoding chip, the encoder, and the decoder may be implemented by hardware circuits. For example, the flag setting module 112, the palette table establishing module 114, the index map establishing module 116, the encoding module 118, the receiving module 122, the flag state determining module 124 and the decoding module 126 may be implemented by hardware circuits to become a flag setting circuit, a palette table establishing circuit, an index map establishing circuit, an encoding circuit, a receiving circuit, a flag state determining circuit, and a decoding circuit. In another exemplary embodiment of the present disclosure, the encoder and the decoder may be implemented by hardware circuits as one chip. In another exemplary embodiment of the present disclosure, the encoder and the decoder may be implemented by hardware circuits as an encoding chip and a decoding chip respectively.

In order to describe the operations of the encoder 110, the decoder 120, and the encoding/decoding chip 100 more clearly, an exemplary embodiment is further provided below with reference to the encoding/decoding chip 100 of FIG. 1C.

Figure 2A:
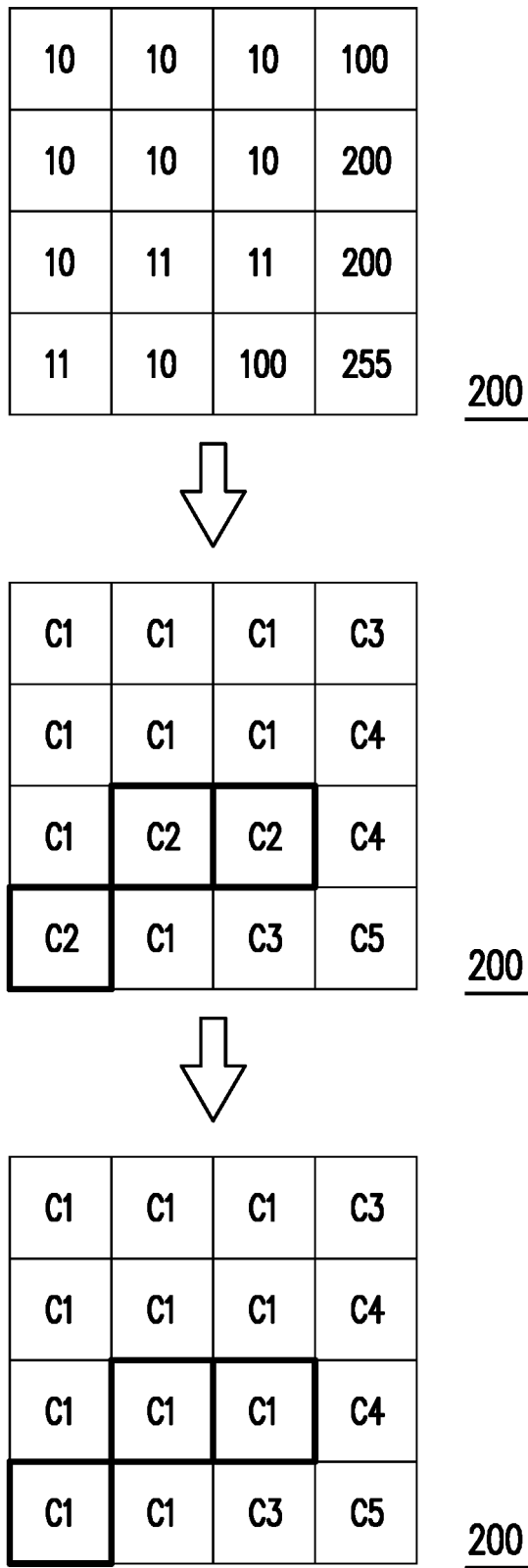

FIG. 2A and FIG. 2B are schematic diagrams illustrating operations of encoding image according to an exemplary embodiment of the present disclosure. For illustrative convenience, following descriptions are made by using a coding unit block 200 with the block size of 4×4.

Referring to FIG. 2A, in a palette mode, the encoder 110 searches for one or more major colors to represent pixels within the coding unit block 200 currently under encoding, and uses indexes corresponding to the one or more major colors to perform index numbering for the pixels within the coding unit block.

For instance, the palette table establishing module 114 establishes a palette table corresponding to the coding unit block 200 so that the index map establishing module 116 may generate an index map corresponding to the coding unit block according to the palette table corresponding to the coding unit block 200 and the colors of the pixels of the coding unit block. In the operation of establishing the palette table corresponding to the coding unit block 200, the palette table establishing module 114 selects the one or more major colors corresponding to the coding unit block 200 according to the colors of the pixels of the coding unit block 200. In the present exemplary embodiment, colors corresponding to pixel values (i.e., "10", "11", "100", "200", and "255") from each of original pixels of the coding unit block 200 are represented by a color C1, a color C2, a color C3, a color C4, and a color C5, respectively. In one embodiment, a value of the color C1 is the pixel value "10", and similarly, values of the color C2, the color C3, the color C4, and the color C5 are the pixel values "11", "100", "200", and "255", respectively; whereas in another embodiment, the color C1, the color C2, the color C3, the color C4, and the color C5 may be obtained by encoding the pixel values "10", "11", "100", "200", and "255" based on actual requirements. Because the colors of the color C1 and the color C2 are similar (e.g., a difference between the pixel values of the pixels of the color C1 and color C2 is less than a color difference threshold (e.g., the color difference threshold is set to be 5)), the palette table establishing module 114 only selects the color C1 as the major color corresponding to the pixels with the pixel value being "10" and the pixels with the pixel value being "11". Lastly, the major colors corresponding to the coding unit block 200 selected by the palette table establishing module 114 are the color C1, the color C3, the color C4, and the color C5.

Referring to FIG. 2B, subsequently, the palette table establishing module 114 sets the index values corresponding to the major colors. For example, the palette table establishing module 114 uses numbers 0, 1, 2, and 3 as the index values corresponding to the major colors C1, C3, C4, and C5 respectively according to the previously selected major colors C1, C3, C4, and C5.

In the present exemplary embodiment, because the colors of the pixels of the coding unit block 200 may all be represented by the major colors of the coding unit block 200 without including the escape pixel, the flag setting module 112 sets the flag corresponding to the coding unit block 200 as the first state value. For example, the first state value is represented by the Boolean value, and the flag setting module 112 sets the first state value as "0". Accordingly, the palette table establishing module 114 may determine that the coding unit block 200 does not include the escape pixel according to the first state value of the flag, and set the amount of the indexes of the palette table corresponding to the coding unit block 200 as an amount of the major colors of the coding unit block 200.

FIG. 3 is a schematic diagram illustrating a palette table according to an exemplary embodiment of the present disclosure.

Referring to FIG. 3, in the present exemplary embodiment, as described above, the colors of the pixels of the coding unit block 200 may all be represented by the major colors of the coding unit block 200. Accordingly, the palette table establishing module 114 sets the amount of the indexes of the palette table corresponding to the coding unit block 200 as the amount of the one or more major colors of the coding unit block 200. For example, the amount of the major colors of the coding unit block 200 is four (i.e., the major colors C1, C3, C4, and C5). Therefore, as shown in FIG. 3, the palette table establishing module 114 sets the amount of the indexes of a palette table 300 corresponding to the coding unit block 200 as an exact size for recording the four major colors. Further, the palette table establishing module 114 records the major colors (i.e., the major colors C1, C3, C4, and C5, and the pixel values thereof are "10", "100", "200", and "255", respectively) and the index values (i.e., 0 to 3) corresponding to the major colors into a color field 304 and an index value field 302 respectively.

In the present exemplary embodiment, the maximum value (i.e., 3) among the index values of the major colors in the palette table 300 is the amount of the major colors corresponding to the coding unit block 200 minus one. Further, the amount of the major colors corresponding to the coding unit block 200 is equal to a total number of the index values of the major colors recorded in the palette table 300. In other words, when the colors of the pixels of the coding unit block 200 may all be represented by the major colors of the coding unit block 200, it indicates that the coding unit block 200 currently under encoding does not include the escape pixel. Thus, in this case, the palette table 300 established by the palette table establishing module 114 does not reserve fields for an escape index corresponding to the escape pixel in order to reduce the encoded bit number of the index value, such that a redundant bit transmission may be avoided to reduce unnecessary waste during the transmission of the indexes. In the present exemplary embodiment, for clear descriptions, the color field 304 is represented in a manner of "the major color: the pixel value" (e.g., C1:10, C3:100, C4:200, and C5:255). In one embodiment, the color field 304 includes the pixel values "10", "100", "200", and "255".

Figure 4:
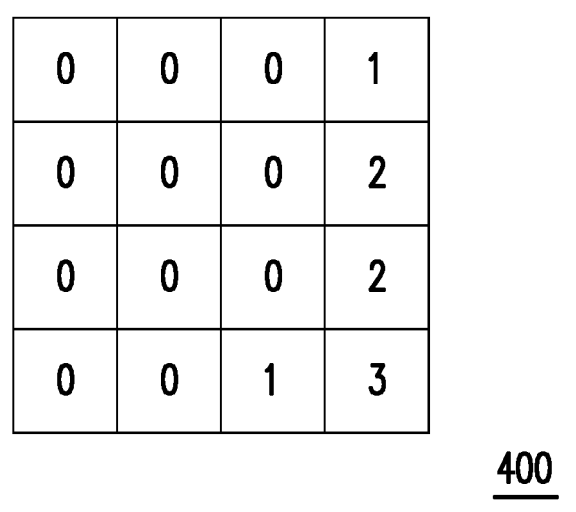

FIG. 4 illustrates an example for establishing an index map according to an exemplary embodiment of the present disclosure.

Referring to FIG. 4, thereafter, the index map establishing module 116 may perform the index numbering on the pixels in the coding unit block 200 according to the index values "0", "1", "2", and "3" corresponding to the major colors C1, C3, C4, and C5 in order to generate an index map 400. In other words, in the index map 400, the colors of the pixels of the coding unit block 200 are represented by the index values "0", "1", "2", and "3" corresponding to the major colors C1, C3, C4, and C5.

Subsequently, the encoding module 118 encodes the flag, the palette table 300 and the index map 400 corresponding to the coding unit block 200 by the CABAC before transmitting to the decoder 120, or directly transmits the flag, the palette table 300 and the index map 400 corresponding to the coding unit block 200 to the decoder 120.

Specifically, in the present exemplary embodiment, the palette table establishing module 114 is not forced to reserve the fields for the escape index, and there are four index values since the amount of the major colors of the coding unit block 200 is four. Herein, it is assumed that a fixed length encoding method is used in the present exemplary embodiment, and thus only two bits are required to encode the four index values. For example, with the index values corresponding to the major colors C1, C3, C4, and C5 being "0", "1", "2", and "3" respectively, the index map establishing module 116 may use "00", "01", "10", and "11" in binary numeral system to encode the four index values, and record "00", "01", "10", and "11" in binary numeral system into the index map. In view of the above, in the situation where the escape index is forced to be reserved, because the amount of the index values is increased to five, three bits are required to encode the five index values. Accordingly, the method for encoding of the present exemplary embodiment is capable of saving one bit each time when the index value of one pixel is transmitted. In the present embodiment, because the size of the coding unit block 200 is 4×4, the size of the index map 400 corresponding to the coding unit block 200 is also 4×4. In the case where the compression and other processes are not performed, a transmission amount of sixteen bits may be saved while transmitting the index values of a 4×4 number of pixels.

Figure 5:
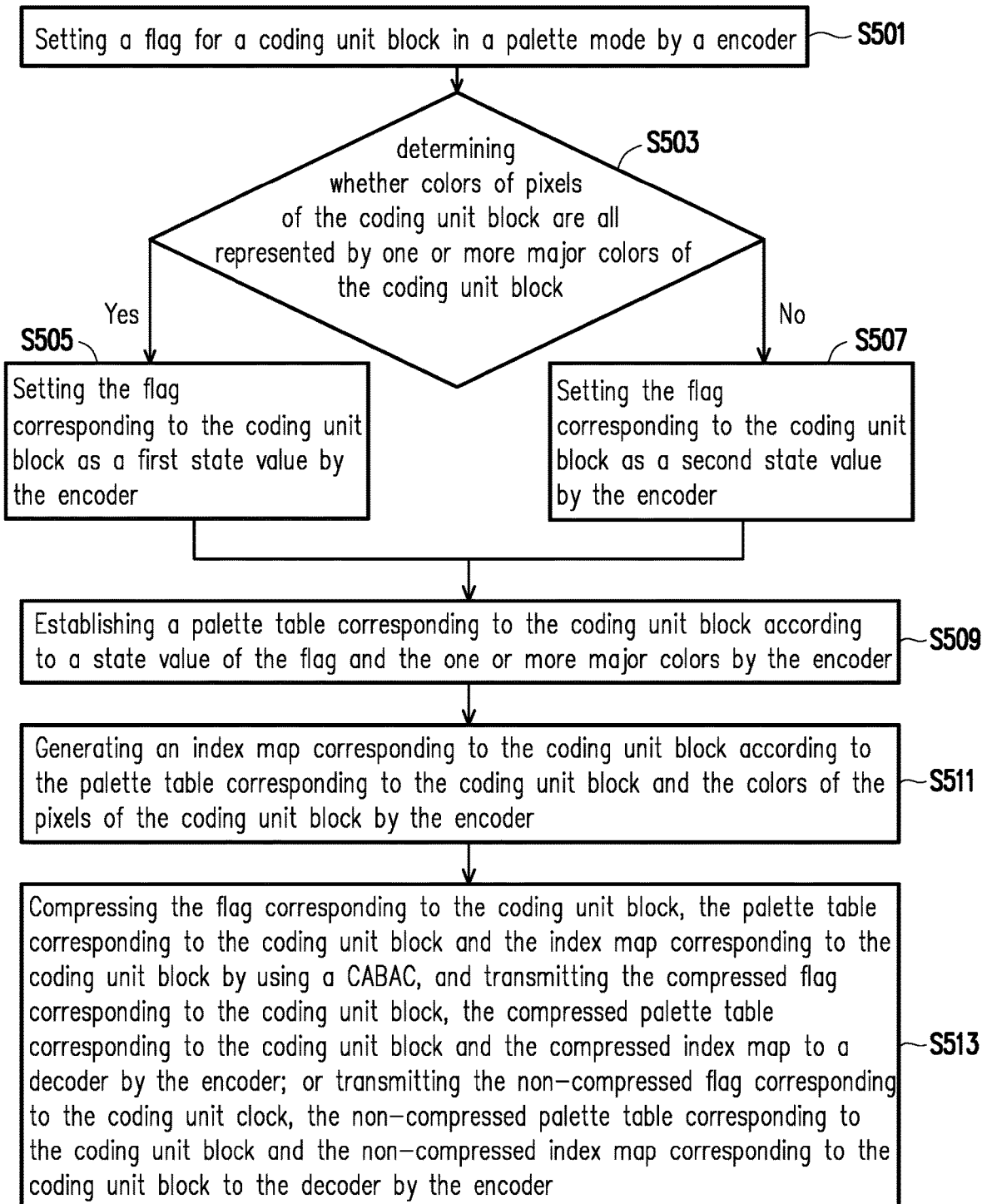
FIG. 5 is a flowchart illustrating an encoding method according to an exemplary embodiment of the present disclosure.

FIG. 5 is a flowchart illustrating an encoding method according to an exemplary embodiment of the present disclosure.

Referring to FIG. 5, in step S501, the encoder 110 sets a flag for a coding unit block in a palette mode.

In step S503, the encoder 110 determines whether colors of pixels of the coding unit block are all represented by one or more major colors of the coding unit block.

In step S505, if the colors of the pixels of the coding unit block are all represented by the one or more major colors of the coding unit block, the encoder 110 sets the flag corresponding to the coding unit block as a first state value. Otherwise, in step S507, if the color of at least one pixel among the pixels of the coding unit block is not represented by the one or more major colors of the coding unit block, the flag corresponding to the coding unit block is set as a second state value.

Subsequently, in step S509, the encoder 110 establishes a palette table corresponding to the coding unit block according to a state value of the flag and the one or more major colors.

In step S511, the encoder 110 generates an index map corresponding to the coding unit block according to the palette table corresponding to the coding unit block and the colors of the pixels of the coding unit block.

Thereafter, in step S513, the encoder 110 compresses the flag corresponding to the coding unit block, the palette table corresponding to the coding unit block, and the index map corresponding to the coding unit block by using a CABAC, and transmits the compressed flag corresponding to the coding unit block, the compressed palette table corresponding to the coding unit block, and the compressed index map to a decoder of the decoding end, or the decoder 120 of the encoding/decoding chip 100. Alternatively, the encoder 110 transmits the non-compressed flag corresponding to the coding unit block, the non-compressed palette table corresponding to the coding unit block, and the non-compressed index map corresponding to the coding unit block to the decoder of the decoding end or the decoder 120 of the encoding/decoding chip 100. Herein, the CABAC compressing may be performed by using the bypass mode of the CABAC or the context mode of the CABAC. In another exemplary embodiment, the encoder 110 compresses the flag corresponding to the coding unit block, the palette table corresponding to the coding unit block, and the index map corresponding to the coding unit block by using the CABAC before transmitting to a storage medium for storage. Alternatively, the encoder 110 transmits the non-compressed flag corresponding to the coding unit block, the non-compressed palette table corresponding to the coding unit block, and the non-compressed index map corresponding to the coding unit block to the storage medium for storage. The storage medium may be the storage circuit 130 of the encoder 110, the storage circuit 102 of the encoding/decoding chip 100, another storage medium at the encoding end (e.g., a hard disk), or even another storage medium not at the encoding end (i.e., a cloud hard disk).

In the present exemplary embodiment, when the flag corresponding to the coding unit block 200 and the palette table 300 corresponding to the coding unit block 200 are received by the receiving module 122 of the decoder 120, if the received flag corresponding to the coding unit block 200 and the palette table 300 corresponding to the coding unit block 200 are data encoded by the CABAC, the receiving module 122 performs the CABAC decoding first. For example, if the received flag corresponding to the coding unit block 200 is compressed by using the bypass mode of the CABAC or the context mode of the CABAC, the receiving module 122 correspondingly uses the bypass mode of the CABAC or the context mode of the CABAC in order to decompress the flag corresponding to the coding unit block 200; and similarly, if the received palette table 300 corresponding to the coding unit block 200 is compressed by using the bypass mode of the CABAC or the context mode of the CABAC, the receiving module 122 correspondingly uses the bypass mode of the CABAC or the context mode of the CABAC in order to decompress the palette table 300 corresponding to the coding unit block 200. Thereafter, the flag state determining module 124 determines the state value of the flag corresponding to the coding unit block 200. For example, in the present exemplary embodiment, the flag state determining module 124 determines that the received flag is set as the first state value (e.g., "0"). Accordingly, the flag state determining module 124 may determine that the coding unit block 200 does not include the escape pixel, and determine that the amount of the indexes of the palette table 300 corresponding to the coding unit block 200 is the amount of the major colors of the coding unit block. In another embodiment, the flag state determining module 124 may determine that the received flag is set as the second state value (e.g., "1"). Accordingly, the flag state determining module 124 may determine that the coding unit block 200 includes the escape pixel, and determine that the amount of the indexes of the palette table 300 corresponding to the coding unit block 200 is the amount of the major colors of the coding unit block plus one.

Subsequently, the decoding module 126 receives the index map 400. If the received index map 400 is encoded by the CABAC, the decoding module 126 performs the CABAC decoding first. For example, if the received index map 400 corresponding to the coding unit block 200 is compressed by using the bypass mode of the CABAC or the context mode of the CABAC, the decoding module 126 correspondingly uses the bypass mode of the CABAC or the context mode of the CABAC to decompress the index values of the index map 400 corresponding to the coding unit block 200 according to the amount of the indexes of the palette table 300 corresponding to the coding unit block 200. Thereafter, the decoding module 126 reconstructs the coding unit block 200. Specifically, the decoding module 126 searches the palette table 300 according to the index values of the pixels of the index map 400 (e.g., by using a look-up table), and the pixel value represented by the major color corresponding to the matched index value is the pixel value of the pixel in the coding unit block 200. For example, if the index value of one of the pixels in the index map 400 is "0", in the palette table 300, the major color corresponding to the index value being "0" is C1, and the pixel value thereof is "10". Therefore, the decoding module 126 reconstructs that pixel value of the coding unit block 200 as "10". And then, by analogy, the decoding module 126 reconstructs the pixels of the coding unit block 200 one by one, so as to reconstruct the coding unit block 200. In the present exemplary embodiment, the decoder 120 receives the flag, the palette table 300, and the index map 400 transmitted from the encoder 110 of the encoding/decoding chip 100 or the encoder of the encoding end. In another exemplary embodiment, the decoder 120 may receive the flag, the palette table 300, and the index map 400 transmitted from a storage medium. The storage medium may be the storage circuit 150 of the decoder 120, the storage circuit 102 of the encoding/decoding chip 100, another storage medium at the decoding end (e.g., a hard disk), or even another storage medium not at the decoding end (i.e., a cloud hard disk).

FIG. 6A illustrates a program code for decoding the flag corresponding to the coding unit block, the palette table corresponding to the coding unit block, and the index map corresponding to the coding unit block by using the CABAC according to an exemplary embodiment of the present disclosure. Referring to FIG. 6A, in this exemplary embodiment, it is assumed that the decompressing method used for the flag, the palette table, and the index map currently under decoding is the bypass mode of the CABAC. Herein, as shown in FIG. 6A, the bypass mode is represented by a parameter "decodeBinEP", an action for performing the CABAC decoding is represented by "parse", the palette mode is represented by a parameter "PLTMode", the amount of the major colors and the major colors are represented by parameters "PLTSize" and "PLT" respectively, the maximum value of the indexes of the palette table is represented by a parameter "uiIndexMaxSize", and the flag is represented by a parameter "uiSignalEscape".

Referring back to FIG. 6A, in a process 601, the decoder 120 confirms whether a current decoding mode is the palette mode. If it is determined that the palette mode is currently used, the decoder 120 decodes the amount of the major colors and the major colors by using the CABAC in a process 602. Subsequently, in a process 603, a value of the variable "uiIndexMaxSize" is set as the amount of the major colors.

In a process 604, the decoder 120 decodes the flag by using the bypass mode of the CABAC. Herein, if the decoder 120 determines that the state value of the flag corresponding to the coding unit block 200 is "1" in a process 605, the decoder 120 may determine that the coding unit block currently under decoding includes the escape pixel. Therefore, in a process 606, the decoder 120 further sets the amount of indexes (i.e., "uiIndexMaxSize") of the palette table corresponding to the coding unit block as the amount of the major colors of the coding unit block plus one. In this case, the index values that fall within a range from "0" to "uiIndexMaxSize minus 2" are all the indexes of the major colors, and the index value being "uiIndexMaxSize minus one" is the index of the escape pixel.

Thereafter, in a process 607, the decoder 120 decodes the indexes within the index map. In this exemplary embodiment, because the coding block unit currently under decoding includes the escape pixel, the decoder 120 decodes the pixel value of the escape pixel in a process 608. Accordingly, the decoder 120 may reconstruct the coding unit block by decoding and reconstructing each of the pixels in the coding unit block currently under decoding.

Figures 2, 6B:
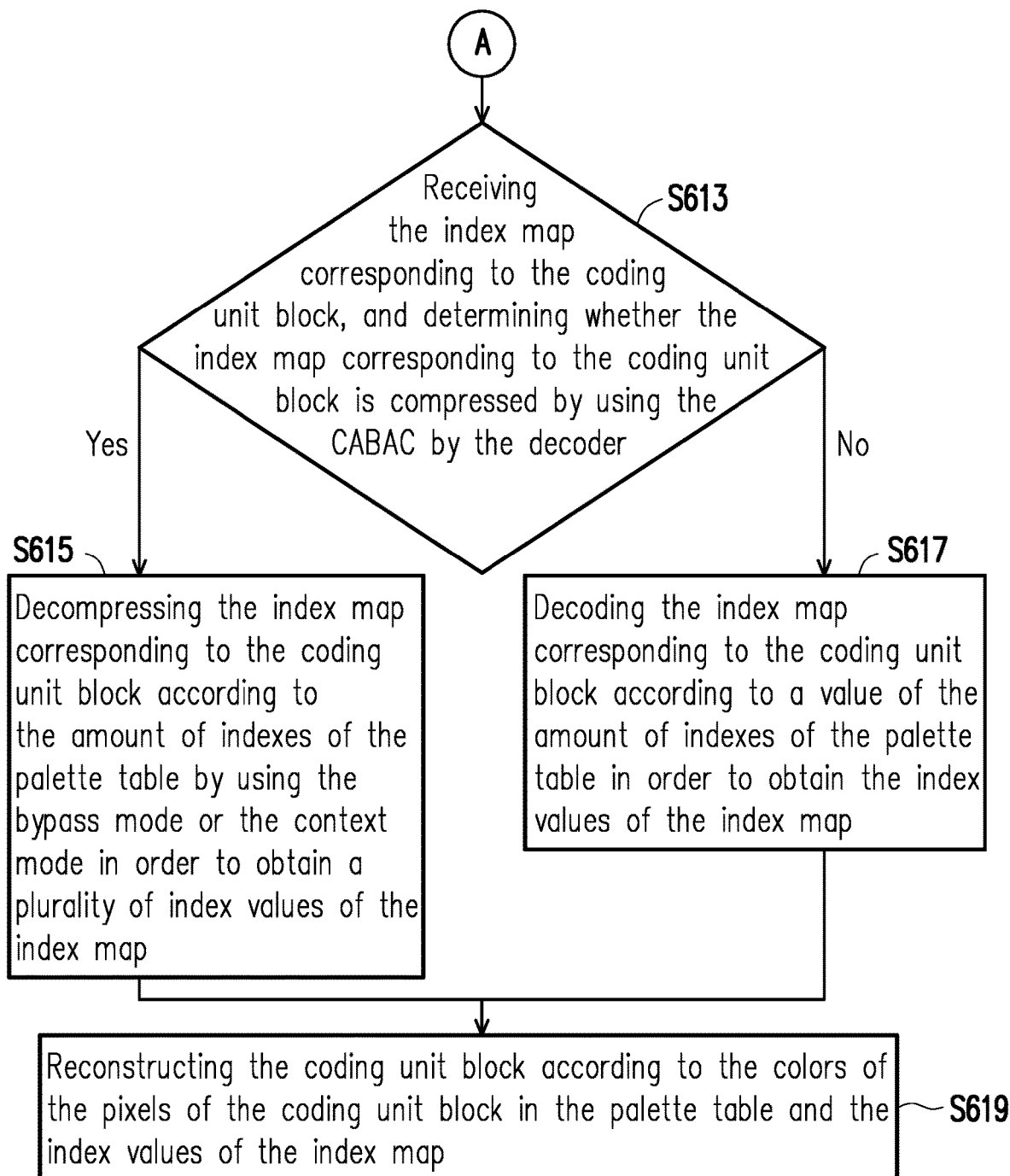

FIG. 6B-1 and FIG. 6B-2 are a flowchart illustrating a method for decoding according to an exemplary embodiment of the present disclosure.

Referring to FIG. 6B-1 and FIG. 6B-2, in step S601, the decoder 120 receives a flag corresponding to a coding unit block and a palette table corresponding to the coding unit block.

In step S603, the decoder 120 determines whether the flag corresponding to the coding unit block and the palette table corresponding to the coding unit block are compressed by using a CABAC.

If the received flag corresponding to the coding unit block and the received palette table corresponding to the coding unit block are compressed by using the CABAC, the decoder 120 decompresses the flag and the palette table corresponding to the coding unit block by using the bypass mode of the CABAC or the context mode of the CABAC in step S605. Otherwise, if the received flag corresponding to the coding unit block and the palette table corresponding to the coding unit block are not compressed by using the CABAC, proceeding to step S607. In the present exemplary embodiment, the decoder 120 determines whether the flag corresponding to the coding unit block and the palette table corresponding to the coding unit block are compressed by using the CABAC. In another exemplary embodiment, the decoder 120 does not determine whether the received flag corresponding to the coding unit block and the received palette table corresponding to the coding unit block are compressed by using the CABAC, but directly decompresses the flag and the palette table corresponding to the coding unit block by using the bypass mode of the CABAC or the context mode of the CABAC. In other words, after step S601, proceeding to step S605 instead of step S603. In an exemplary embodiment, the encoder 110 and the decoder 120 may determine whether to compress or decompress by using the bypass mode or the context mode of the CABAC based on settings, or may determine whether to compress or decompress by using the bypass mode of the CABAC or the context mode of the CABAC based on a communication (e.g., information exchange) between the encoder 110 and the decoder 120.

In step S607, the decoder 120 determines whether a state value of the flag corresponding to the coding unit block is the first state value or the second state value in the palette mode.

If the flag is the first state value, in step S609, the decoder 120 determines that an amount of the indexes of the palette table corresponding to the coding unit block is an amount of the one or more major colors of the coding unit block.

If the flag is the second state value, in step S611, the decoder 120 determines that the amount of the indexes of the palette table corresponding to the coding unit block is the amount of the one or more major colors of the coding unit block plus one.

Subsequently, in step S613 in FIG. 6B-2, the decoder 120 receives the index map corresponding to the coding unit block, and determines whether the index map corresponding to the coding unit block is compressed by using the CABAC.

If the received index map corresponding to the coding unit block is compressed by using the CABAC, in step S615, the decoder 120 decompresses the index map corresponding to the coding unit block according to the amount of the indexes of the palette table by using the bypass mode or the context mode in order to obtain a plurality of index values of the index map. Otherwise, if the received flag corresponding to the coding unit block and the palette table corresponding to the coding unit block are not compressed by using the CABAC, in step S617, the decoder 120 decodes the index map corresponding to the coding unit block according to a value of the amount of the indexes of the palette table in order to obtain the index values of the index map. In another embodiment, after the index map corresponding to the coding unit block is received, the decoder 120 does not determine whether the index map corresponding to coding unit block is compressed by using the CABAC but directly decompresses the index map corresponding to the coding unit block according to the value of the amount of the indexes of the palette table by using the bypass mode or the context mode in order to obtain the index values of the index map. In other words, after the index map is received in step S613, proceeding to step S615 without determination, and not proceeding to step S617. In an exemplary embodiment, the encoder 110 and the decoder 120 may determine whether to compress or decompress by using the bypass mode or the context mode of the CABAC based on settings, or may determine whether to compress or decompress by using the bypass mode of the CABAC or the context mode of the CABAC based on a communication (e.g., information exchange) between the encoder 110 and the decoder 120.

Thereafter, in step S619, the decoder 120 reconstructs the coding unit block according to the colors of the pixels of the coding unit block in the palette table and the index values of the index map.

It is worth mentioning that, in another exemplary embodiment of the present disclosure, the flag corresponding to the coding unit block, the palette table corresponding to the coding unit block, and the index map corresponding to the coding unit block may also be received by the decoder 120 at the same time, and then decoded by the decoder 120.

In another exemplary embodiment of the present disclosure, the encoder may use the escape pixel to replace a part of the pixels corresponding to the major colors in order to reduce the amount of the transmitted bits.

Figure 7A:
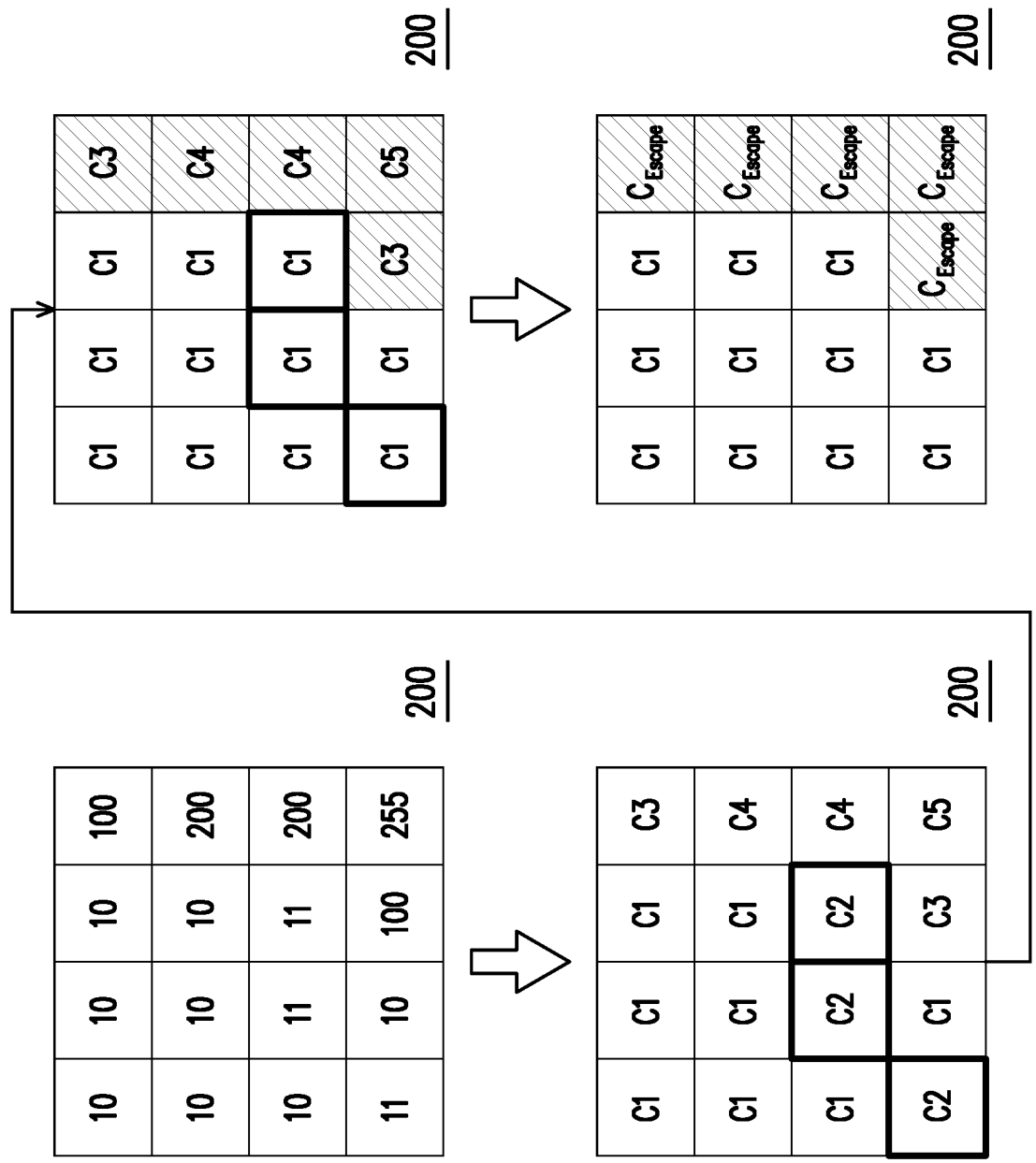

FIG. 7A and FIG. 7B are schematic diagrams illustrating operations of encoding image according to another exemplary embodiment of the present disclosure.

Referring to FIG. 7A, in the present exemplary embodiment, in the operation of establishing the palette table corresponding to the coding unit block 200, the palette table establishing module 114 selects one or more candidate colors corresponding to the coding unit block 200 according to the colors of the pixels of the coding unit block 200. Specifically, pixel values (i.e., "10", "11", "100", "200", and "255") of original pixels of the coding unit block 200 are represented by a color C1, a color C2, a color C3, a color C4 and, a color C5, respectively. In one embodiment, a value of the color C1 is the pixel value "10", and similarly, the values of the color C2, the color C3, the color C4, and the color C5 are the pixel values "11", "100", "200", and "255", respectively; whereas in another embodiment, the color C1, the color C2, the color C3, the color C4, and the color C5 may be obtained by encoding according to the pixel values "10", "11", "100", "200", and "255" based on requirements. Because the colors of the color C1 and the color C2 are similar (e.g., a difference between the pixel values of the pixels of the color C1 and color C2 is less than a color difference threshold (e.g., the color difference threshold is the palette table establishing module 114 selects the color C1 as the candidate color corresponding to the pixels of the pixel value being "10" and the pixel value being "11". Therefore, the candidate colors corresponding to the coding unit block 200 selected by the palette table establishing module 114 are the color C1, the color C3, the color C4, and the color C5, respectively.

Subsequently, according to the candidate colors C1, C3, C4, and C5, the palette table establishing module 114 quantifies the pixels corresponding to the pixel value being "10" and the pixel value being "11" to the candidate color C1, quantifies the pixels corresponding to the pixel value being "100" to the candidate color C3, quantifies the pixels corresponding to the pixel value being "200" to the candidate color C4, and quantifies the pixels corresponding to the pixel value being "255" to the candidate color C5.

In the present exemplary embodiment, the palette table establishing module 114 sets the candidate colors as the one or more major colors and the escape pixel respectively according to the pixel values of the candidate colors. For instance, the palette table establishing module 114 selects and sets the one or more major colors corresponding to the coding unit block 200 according to an amount threshold. For example, when a pixel amount of one specific candidate color is greater than the amount threshold, the specific candidate color is set as one major color; whereas when the pixel amount of one specific candidate color is less than or equal to the amount threshold, the pixel(s) of the specific candidate color is set as escape pixel(s). In the present exemplary embodiment, it is assumed that the amount threshold is 2, and the amount of the pixels corresponding to the color C1 (i.e., 11) is greater than the amount threshold. Therefore, the palette table establishing module 114 selects the candidate color C1 as the major color C1 corresponding to the coding unit block 200, and a value of the major color C1 may be the pixel value "10" or an encoding value corresponding thereto.

An amount of the pixels corresponding to the candidate color C3 (i.e., 2) is equal to the amount threshold, an amount of the pixels corresponding to the candidate color C4 (i.e., 2) is equal to the amount threshold, and an amount of the pixels corresponding to the candidate color C5 (i.e., 1) is less than the amount threshold. Accordingly, the palette table establishing module 114 sets the pixels corresponding to the candidate colors C3, C4, and C5 as escape pixels $C_{Escape}$.

In view of the above, in the present exemplary embodiment, the amount of the pixels of the candidate colors quantified to the major colors is greater than the amount threshold (i.e., 2), and the amount of the pixels of the candidate colors quantified to the escape pixel $C_{Escape}$ is not greater than the amount threshold. It is worth mentioning that, the color difference threshold and the amount threshold are not particularly limited in the present disclosure. For example, in another exemplary embodiment, the color difference threshold and the amount threshold may be dynamically adjusted with quantified parameters in the encoding computation.

Referring to FIG. 7B, subsequently, the palette table establishing module 114 sets index values corresponding to the major color C1 and corresponding to the escape pixel $C_{Escape}$, respectively. For example, the palette table establishing module 114 use numbers 0 and 1 as the index values corresponding to the major color C1 and corresponding to the escape pixel $C_{Escape}$ respectively.

In the present exemplary embodiment, because the color of at least one pixel of the coding unit block 200 is not represented by the one or more major colors of the coding unit block 200, the flag setting module 112 sets the flag corresponding to the coding unit block 200 as the second state value. For example, the second state value is represented by the Boolean value, and the flag setting module 112 sets the flag as "1" when the color of the at least one pixel of the coding unit block 200 is not represented by the one or more major colors of the coding unit block 200. Accordingly, the palette table establishing module 114 may determine that the coding unit block 200 includes the escape pixel according to the second state value of the flag, and set the amount of the indexes of the palette table corresponding to the coding unit block 200 as the amount of the major colors of the coding unit block 200 plus one.

FIG. 8 is a schematic diagram illustrating a palette table according to another exemplary embodiment of the present disclosure.

Referring to FIG. 8, in the present exemplary embodiment, the colors of the pixels of the coding unit block 200 are not all represented by the major colors of the coding unit block 200. Accordingly, the palette table establishing module 114 sets the amount of the indexes of the palette table corresponding to the coding unit block 200 as the amount of the one or more major colors of the coding unit block 200 plus one. For example, the amount of the major colors of the coding unit block 200 is 1 (i.e., the major color C1). Therefore, as shown in FIG. 8, the palette table establishing module 114 sets the amount of the indexes of a palette table 800 corresponding to the coding unit block 200 as 2. Further, the palette table establishing module 114 records this major color C1 and the index value corresponding to this major color (i.e., 0) into a color field 804 and an index value field 802 in a first row 810 in the palette table 800 respectively, and records the index value corresponding to the escape pixel $C_{Escape}$ (i.e., 1) into the index value field 802 in a second row 820 of the palette table 800. Further, in the palette table 800, the palette table establishing module 114 sets a maximum value among the index values as the amount of the major colors corresponding to the coding unit block. For example, the maximum value among the index values (i.e., 1) is the amount of the major colors (i.e., the major color C1) corresponding to the coding unit block 200. Further, the amount of the major colors corresponding to the coding unit block 200 plus one (i.e., 2) is equal to a total number of the index values of the major colors recorded in the palette table 800 plus one.

FIG. 9 illustrates an example for establishing an index map according to another exemplary embodiment of the present disclosure.

Referring to FIG. 9, thereafter, the index map establishing module 116 may use the palette mode to perform the index numbering on the pixels in the coding unit block 200 according to the index value corresponding to the major color C1 (i.e., 0) and the index value corresponding to the escape pixel $C_{Escape}$ (i.e., 1) in order to generate an index map 900. In other words, each of the colors of the pixels of the coding unit block 200 in the index map 900 is represented by the index values "0" and "1" corresponding to the major color C1 and the escape pixel C Escape. In an exemplary embodiment, referring to FIG. 8 and FIG. 9 together, the pixel values of the pixels having the index values set as "1"(i.e., the escape pixel C Escape) are transmitted to the decoding end in a traditional manner. As such, it is not required to set the color field 804 in the second row 820 in FIG. 8 to a specific pixel value.

Subsequently, the encoding module 118 encodes the flag, the palette table 800, and the index map 900 by the CABAC before transmitting to the decoder 120, or transmits the flag, the palette table 800 and the index map 900 to the decoder 120. In the present exemplary embodiment, the encoding module 118 further transmits the pixel values of the original pixels corresponding to the colors C3, C4, and C5 belonging to the escape pixel $C_{Escape}$ to the decoder 120. However, the present disclosure is not limited thereto. For example, in another exemplary embodiment, the palette table 800 transmitted by the encoding module 118 includes the major colors and the index values thereof (e.g., the first row 810 of the palette table 800 in the present exemplary embodiment) but not including the corresponding field of the escape pixel (e.g., the second row 820 of the palette table 800 in the present exemplary embodiment); and in another exemplary embodiment, the palette table 800 transmitted by the encoding module 118 includes the major colors (e.g., the color field 804 in the first row 810 of the palette table 800 in the present exemplary embodiment) but not including the index values (e.g., the index value field 802 in the first row 810 of the palette table 800 in the present exemplary embodiment) nor the corresponding fields of the escape pixel, so that the decoding end may determine the index based on the settings or a protocol with the encoding end when the major colors are received. For example, the index value of the first received major color is "0", the index value of the second received major color is "1", and the rest may be deduced by analogy.

Specifically, in the present exemplary embodiment, the palette table establishing module 114 uses the escape pixel to replace the part of pixels which can be represented by the major colors, so that there is only one index corresponding to the major color of the coding unit block 200 and one escape index in the present exemplary embodiment. Accordingly, only two index values are to be transmitted to the decoder 120. Herein, it is assumed that the fixed length encoding method is used, so that said two index values may be encoded by using one bit. For example, if the index values corresponding to the major color C1 and the escape pixel $C_{Escape}$ are "0" and "1" respectively, the index map establishing module 116 may encode the two index values by using the "0" and "1" in binary system, and record the "0" and "1" in binary system into the index map. In the case where the escape index is forced to be reserved and not using the scheme of changing the pixels of the major colors to the escape pixel, five index values are to be encoded by using three bits. In other words, by using the encoding method of the present exemplary embodiment, the encoding module 118 is capable of saving two bits each time when the index value of one pixel is transmitted. In the present embodiment, because the size of the coding unit block 200 is 4×4, the size of the index map 400 corresponding to the coding unit block 200 is also 4×4. In the case where the compression and other processes are not performed, a transmission amount of thirty-two bits may be saved when transmitting the index values of a 4×4 number of pixels.

On the other hand, when the flag corresponding to the coding unit block 200 and the palette table 800 corresponding to the coding unit block 200 are received (and decoded) by the receiving module 122 of the decoder 120, the flag state determining module 124 determines the state value of the flag corresponding to the coding unit block 200. For example, in the exemplary embodiment, the flag state determining module 124 determines that the received flag is set as the second state value (e.g., "1"). Accordingly, the flag state determining module 124 determines that the coding unit block 200 includes the escape pixel, and determines that the amount of the indexes of the palette table 800 corresponding to the coding unit block 200 is the amount of the major colors of the coding unit block plus one.

Subsequently, the decoding module 126 decodes the index map 900 by using the CABAC according to the amount of the indexes and reconstructs the coding unit block 200. More specifically, after the index map 900 is decoded, the decoding module 126 searches the palette table 800 according to the index values of the pixels of the index map 900 (e.g., by using a look-up table), and the pixel value represented by the major color corresponding to the matched index is the pixel value of the pixel in the coding unit block 200. For example, if the index value of one of the pixels in the index map 900 is "0", in the palette table 800, the major color corresponding to the index value being "0" is C1, and the pixel value thereof is "10". Therefore, the decoding module 126 reconstructs that pixel value of the coding unit block 200 as "10". Further, by analogy, the decoding module 126 reconstructs the pixels of the coding unit block 200 one by one, so as to reconstruct the coding unit block 200. As another example, the index of the one of the pixels in the index map 900 is "1" and the escape pixel is represented by the index value being "1". In this case, the decoding module 126 reconstructs the coding unit block 200 according to the received escape pixels one by one in the traditional manner. In addition, in an exemplary embodiment, the received escape pixels are first decoded by the receiving module 122 (e.g., by using the bypass mode of the CABAC and the context mode of the CABAC).

FIG. 10A and FIG. 10B are schematic diagrams illustrating test results obtained from encoding/decoding image according to exemplary embodiments of the present disclosure.

Referring to FIG. 10A and FIG. 10B, in order to evaluate the method for encoding and the method for decoding as proposed by the present disclosure, under an experimental environment specified by a core experiment of the JCT-VC standard organization, the present disclosure is implemented in the reference software HM14.0+RExt7.0+SCM1.0+Q0094+Q0047BF provided by said organization, and results of AllIntra-lossy compression modes are compared. Video formats under testing include the YUV format and the RGB format with a total of 26 testing video files. The 26 testing video files may be divided into 12 types according to video content differences and format differences, and the 12 types may refer to the descriptions provided in a first column at left in FIG. 10A and FIG. 10B. Among the 12 types, "text & graphics with motion" is a video application often encountered by the SCC, which includes content of a common SCC application such as presentation, software, and so on; "mixed content" is a common video SCC video application and a common HEVC natural image application; and "animation" is animation video, where application of "animation" is seldom used in the SCC environment. The video types may also be further divided into three types 720p, 1080p, and 1440p according to their sizes. Herein, the data are all presented in BDrate. BDrate is a conventional objective rating measurement method commonly used by the JCT-VC standard organization. When the data is smaller than zero, it indicates that a visual quality of the same bitrate is better as the data is smaller.

Specifically, the test results shown in FIG. 10A and FIG. 10B are the BDrate performances corresponding to the embodiment in which the coding unit block does not include the escape pixel and the embodiment in which the coding unit block includes the escape pixel respectively in the present disclosure. In view of the data, as compared to the existing methods, the method proposed by the present disclosure can provide substantial improvements in performances under the situation where the complicity almost remains unchanged. The performances of said two embodiments may achieve the improvements of up to −0.7% and −1.4%, respectively. The improvement in "text & graphics with motion" (which is the common video application type for the SCC) is especially significant among those performances.

In view of the above, the method for encoding and the method for decoding, the system for encoding and decoding using the methods, the encoder and the decoder as proposed by the exemplary embodiments of the present disclosure are capable of determining whether to reserve the field for the escape index, such that the bits being transmitted may be saved while effectively reducing the transmission amount during the encoding computation to thereby improve the performance for the screen video coding.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A decoder, comprising:
   a processor circuit, determining a state value of a flag corresponding to a coding unit block in a palette mode,
   wherein if the flag is a first state value, the processor circuit determines that the coding unit block does not include at least one escape pixel,
   wherein if the flag is a second state value, processor circuit determines that the coding unit block includes the at least one escape pixel.

2. The decoder of claim 1, wherein the processor circuit further:
   decoding the flag corresponding to the coding unit block, a palette table corresponding to the coding unit block, and an index map corresponding to the coding unit block, and reconstructing the coding unit block according to the flag corresponding to the coding unit block, the palette table corresponding to the coding unit block, and the index map corresponding to the coding unit block.

3. The decoder of claim 2, wherein the processor circuit further:
   receiving the flag corresponding to the coding unit block and a palette table corresponding to the coding unit block, and decompressing the flag corresponding to the coding unit block and the palette table corresponding to the coding unit block by using a bypass mode of a CABAC or a context mode of the CABAC, wherein the processor circuit receives the index map corresponding to the coding unit block, decompressing the index map corresponding to the coding unit block by using the bypass mode of the CABAC or the context mode of the CABAC.

4. The decoder of claim 3, wherein the processor circuit further determining whether the flag corresponding to the coding unit block and the palette table corresponding to the coding unit block are compressed by using the CABAC, and the processor circuit further determining whether the index map corresponding to the coding unit block is compressed by using the CABAC,
wherein if the processor circuit determines that the received flag corresponding to the coding unit block and the received palette table corresponding to the coding unit block are compressed by using the CABAC, the bypass mode of the CABAC or the context mode of the CABAC are used to decompress the flag corresponding to the coding unit block and the palette table corresponding to the coding unit block, and if the processor circuit determines that the received index map corresponding to the coding unit block is compressed by using the CABAC, the bypass mode of the CABAC or the context mode of the CABAC are used to decompress the index map.

5. The decoder of claim 1, wherein if the flag is the second state value, the processor circuit obtains one or more major colors, and sets a maximum value of indexes of a palette table corresponding to the coding unit block as an amount of the one or more major colors of the coding unit block plus one.

6. The decoder of claim 1, wherein the processor circuit further:
receiving the flag corresponding to the coding unit block and a palette table corresponding to the coding unit block, and decompressing the flag corresponding to the coding unit block and the palette table corresponding to the coding unit block by using a bypass mode of a CABAC or a context mode of the CABAC; and
receiving an index map corresponding to the coding unit block, and decompressing the index map corresponding to the coding unit block according to an amount of indexes by using the bypass mode of the CABAC or the context mode of the CABAC in order to obtain a plurality of index values of the index map.

* * * * *